United States Patent [19]
Deferme

[11] Patent Number: 5,813,500
[45] Date of Patent: Sep. 29, 1998

[54] ANTI-SWISH MECHANISM FOR A DAMPER

[75] Inventor: Stefan Deferme, Heusden-Zolder, Belgium

[73] Assignee: Tenneco Automotive Inc., Lake Forest, Ill.

[21] Appl. No.: 622,563

[22] Filed: Mar. 25, 1996

[51] Int. Cl.[6] ........................................................ F16F 9/50
[52] U.S. Cl. .................................. 188/282.8; 188/327.22
[58] Field of Search ........................ 188/322.15, 322.14, 188/17, 318, 316, 281, 282, 322.22, 282.8

[56] References Cited

U.S. PATENT DOCUMENTS

| | | |
|---|---|---|
| 2,622,613 | 12/1952 | McNeal . |
| 3,194,262 | 7/1965 | Hamilton et al. . |
| 3,550,616 | 12/1970 | Graham et al. . |
| 3,572,377 | 3/1971 | Graham et al. . |
| 3,756,357 | 9/1973 | Graff et al. .............................. 168/317 |
| 3,831,626 | 8/1974 | Peddinghaus . |
| 3,990,862 | 11/1976 | Tanabe . |
| 4,076,276 | 2/1978 | Wijnhoven et al. . |
| 4,460,074 | 7/1984 | Muller et al. ....................... 188/322.14 |
| 4,512,447 | 4/1985 | Miura . |
| 4,721,130 | 1/1988 | Hayashi . |
| 4,782,925 | 11/1988 | Grundei . |
| 4,809,828 | 3/1989 | Nakazato . |
| 4,834,222 | 5/1989 | Kato et al. . |
| 4,895,229 | 1/1990 | Kato . |
| 5,042,624 | 8/1991 | Furuya et al. . |
| 5,115,892 | 5/1992 | Yamaoka et al. . |
| 5,219,414 | 6/1993 | Yamoak .......................... 188/322.14 X |
| 5,325,942 | 7/1994 | Groves et al. . |
| 5,424,398 | 6/1995 | Moradmand et al. ......... 188/322.15 X |
| 5,595,269 | 1/1997 | Beck .............................. 188/322.15 X |

*Primary Examiner*—Lee W. Young
*Attorney, Agent, or Firm*—Harness, Dickey & Pierce

[57] ABSTRACT

An anti-swish mechanism for a damper is disclosed to reduce the swish noise heard during movement of a piston assembly within the damper. The damper includes a pressure cylinder which forms a working chamber having a first portion and a second portion operable to store damping fluid. A piston rod is partially disposed within a pressure cylinder and a piston body is secured within the piston rod. Extending from the piston body are first and second annular axially extending lands which are concentric with the piston body. A set of axially extending, circumferentially spaced flow ports are formed in the piston body between the first and second annular axially extending lands. Adjacent to the flow ports is an anti-swish mechanism which reduces "swish" noise as the piston body moves within the pressure cylinder.

10 Claims, 4 Drawing Sheets

ANTI-SWISH MECHANISM FOR A DAMPER

BACKGROUND OF THE INVENTION

1. Field of the Invention

This invention relates to suspension systems for automotive vehicles and machines which receive mechanical shock, and more particularly to an anti-swish mechanism for a damper.

2. Description of the Related Art

Dampers are used in connection with automotive suspension systems to absorb unwanted vibrations which occur during driving. To dampen unwanted vibrations, dampers are generally connected between the body and the suspension of an automotive vehicle. A piston assembly is located within the damper and is connected to the body of the automotive vehicle through a piston post which in turn is connected to a piston rod. Because the piston assembly is able to limit the flow of damping fluid within the working chamber of the damper when the damper is compressed or extended, the damper is able to provide a dampening force which "smooths" or "dampens" vibrations transmitted from the suspension to the body.

As the fluid flows in the damper during compression and rebound strokes, the fluid tends to create an audible "swish" noise which is annoying or unpleasant to the human ear. This swish noise is generally heard during low velocity rebound or compression strokes because of the relatively low noise environment during this period. However, swish noise is also sometimes heard during higher velocity strokes. This swish noise generally occurs as the fluid flows through an orifice which causes a flow restriction prior to the fluid entering a bleed or flow port in the piston assembly where the flow restriction is reduced (i.e. bleed section becomes larger or wider). By reducing the flow restriction, a lower pressure or under pressure is created (i.e. Bernouilli's equation) at the entrance point or edge of the bleed or flow port which leads to cavitation of the fluid (i.e. forming vapor bubbles) and the resulting swish noise. With conventional piston assembly designs, this point of low pressure occurs at the entrance edge of the bleed or flow port where the fluid enters the bleed or flow port because it is difficult to supply fluid to this point or edge.

What is needed then is a damper which does not suffer from the above-mentioned disadvantage. This will, in turn, eliminate or reduce the swish noise associated with conventional dampers during compression and rebound strokes. It is therefore, an object of the present invention to provide such an anti-swish mechanism for a damper.

SUMMARY OF THE INVENTION

In accordance with the teachings of the present invention, a damper having an anti-swish mechanism is disclosed. The anti-swish mechanism is used to reduce or eliminate swish noise during compression and rebound strokes of the damper. This is basically achieved by providing an anti-swish mechanism positioned adjacent to flow ports axially extending through a piston assembly of the damper. The anti-swish mechanism reduces swish noise as damping fluid passes through the piston assembly within the damper.

In one preferred embodiment, a pressure cylinder forms a working chamber having a first portion and a second portion operable to store damping fluid. A piston rod is partially disposed within the pressure cylinder and a piston body is secured to the piston rod. Extending from the piston body are first and second annular axially extending lands which are concentric with the piston body. An annular anti-swish chamber is concentric with the piston body and positioned between the first and second annular axially extending lands. A set of axially extending, circumferentially spaced flow ports are formed concentrically with the piston body adjacent to the second annular land. As the damping fluid flows from the first portion to the second portion of the working chamber through the set of flow ports, the damping fluid first passes into the annular anti-swish chamber to reduce swish noise.

In another preferred embodiment, the damper includes the pressure cylinder which forms the working chamber having the first portion and the second portion operable to store damping fluid. The piston rod is partially disposed within the pressure cylinder and the piston body is secured to the piston rod. At least one flow port is formed in the piston body which allows damping fluid to flow between the first portion and the second portion of the working chamber. A valve disk is positioned concentrically with the piston body which has a first side and a second side substantially perpendicular to the piston rod with an outer circumferential edge positioned between the first and second sides. The outer circumferential edge has a concentrically tapered surface adjacent to the body such that the concentrically tapered surface reduces swish noise as the damping fluid passes through a flow port.

Use of the present invention provides a damper which reduces or eliminates swish noise during compression or rebound strokes as the piston assembly moves within the damper. As a result, the aforementioned disadvantage associated with the current dampers has been substantially eliminated.

BRIEF DESCRIPTION OF THE DRAWINGS

Still other advantages of the present invention will become apparent to those skilled in the art after reading the following specification and by reference to the following drawings in which.

DETAILED DESCRIPTION OF THE PREFERRED EMBODIMENT(S)

The following description of the, preferred embodiments of the present invention are merely exemplary in nature and are in no way intended to limit the invention or its application or uses. Moreover, while this invention is described in connection with an automotive vehicle, those skilled in the art would readily recognize that the anti-swish mechanism for a damper can be utilized with various other devices which require dampers.

Figures 1A, 1B:
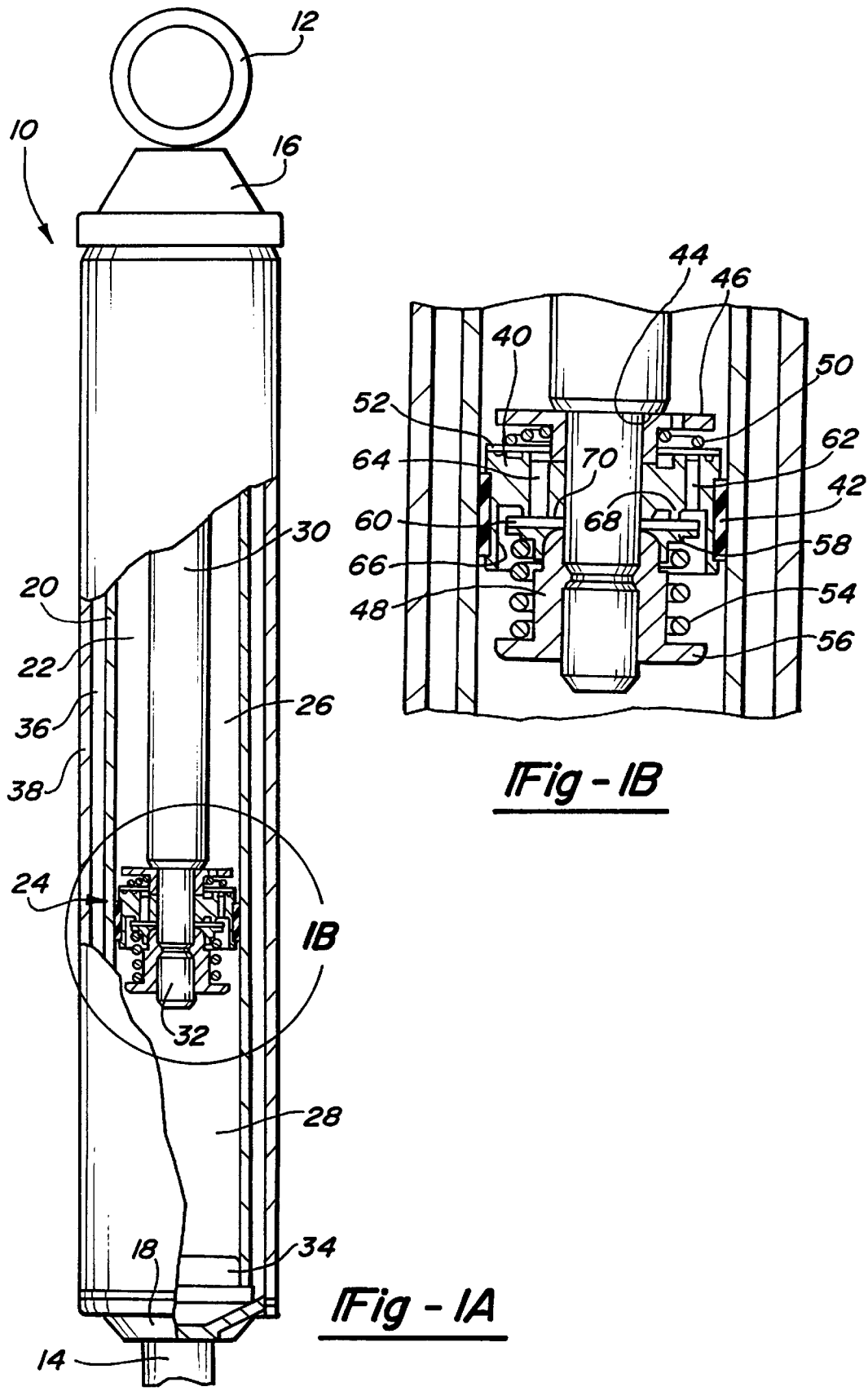
FIG. 1A is a partial cross-sectional view of a damper incorporating the anti-swish mechanism according to the teachings of one of the preferred embodiments of the present invention.
FIG. 1B is an enlarged cross-sectional view of a piston assembly within the damper taken about line 1B in FIG. 1A.

Referring to FIG. 1A, a damper 10 is shown which incorporates one preferred embodiment of the anti-swish mechanism of the present invention. The damper 10 includes an upper end fitting 12 and a lower end fitting 14 used to secure the damper 10 to an automotive vehicle (not shown). The upper end fitting 12 is connected to an upper cap portion 16 of the damper 10 by a weld. The upper end fitting 12 is in turn connected to a body portion of the automotive vehicle. Similarly, the lower end fitting 14 is connected to a lower cap portion 18 so as to secure the damper 10 to a suspension portion of the automotive vehicle. As will be appreciated by those skilled in the art, other suitable means may be used to secure the damper 10 to the automotive vehicle or other devices which require a damper 10. It should also be noted that the term "damper" as used herein refers to dampers in a general sense of the phrase and will include MacPherson struts and shock absorbers.

The damper 10 comprises an elongated tubular pressure cylinder 20 defining a damping fluid-containing working chamber 22. Disposed within the chamber 22 is a reciprocating piston assembly 24. The reciprocating piston assembly 24 is used to restrict the flow of damping fluid between an upper portion 26 and a lower portion 28 of the working chamber 22 so as to generate damping forces. To provide means for securing the reciprocating piston assembly 24 within the pressure cylinder 20, an axially extending piston rod 30 and a piston post 32 are provided. The reciprocating piston assembly 24 is secured to one end of the axially extending piston post 32 which is in turn secured to the axially extending piston rod 30.

A base valve, generally designated by the numeral 34, is located within the lower portion 28 of the pressure cylinder 20 and is used to control the flow of damping fluid between the working chamber 22 and an annular fluid reservoir 36. The annular fluid reservoir 36 is defined as the space between the outer periphery of the pressure cylinder 20 and the inner periphery of a housing 38. The operation of the base valve 34 may be similar to the operation of the base valve shown in U.S. Pat. No. 3,757,910, which is hereby incorporated by reference. However, other types of base valves may also be used.

Referring to the reciprocating piston assembly 24, shown best in FIG. 1B, the piston assembly 24 comprises a piston body 40 having a plurality of ridges (not shown) disposed on the annular exterior of the piston body 40. The ridges are used to secure an annular TEFLON sleeve 42 which is disposed between the ridges of the piston body 40 and the pressure cylinder 20. The TEFLON sleeve 42 permits movement of the piston body 40 with respect to the pressure cylinder 20 without generating excess frictional forces.

Upward movement of the piston body 40 is limited by a radially extended step portion 44 and a support washer 46. Downward movement of the piston body 40 is limited by a threaded nut 48 or similar type fastening element which is threadably received upon the piston post 32. A helical coil compression spring 50 is arranged concentrically with the support washer 46 and bears against an intake valve assembly 52, which will be discussed in detail shortly. A helical coil rebound spring 54 is arranged concentrically with the nut 48 and is supported at the lower end by a radially outwardly extending flange 56 on the lower end of the nut 48. The upper end of the rebound spring 54 bears against a spring retainer 58 which in turn acts against the underside of a disk shaped valve member 60 to thereby resiliently urge the valve member 60 into sealing engagement with the piston body 40.

The piston body 40 further includes a first plurality of axially extending circumferentially spaced flow ports 62 and a second plurality of axially extending, circumferentially spaced flow ports 64. The first plurality of flow ports 62 comprises three circumferentially spaced flow ports 62 which are spaced radially outwardly from and concentrically arranged relative to the second plurality of flow ports 64. The second plurality of flow ports 64 comprises between two to eight circumferentially spaced flow ports 64. While the piston body 40 contains two pluralities of flow ports 62 and 64, one having three individual ports and the other having between two to eight individual ports, those skilled in the art would recognize other configurations of piston bodies having various numbers of flow ports can be utilized in the piston assembly 24.

Disposed within an axially downwardly extending counterbore 66 in the piston body 40 is a lower annular extending land or valve seat 68 spaced radially outward from the second plurality of flow ports 64. The land 68 defines a generally radially extending surface which is adapted to be selectively engaged by the upper side of the generally disk shaped valve member 60. The valve member 60 is adapted to be fixedly retained or secured to the piston body 40 by being clampingly secured between a combination of the nut 48 and the spring retainer 58 and the combination of the land 68 and an annular shoulder 70 on the body 40 of the piston assembly 24. As will be appreciated by those skilled in the art, that while a single valve member 60 is shown, multiple valve members 60 may be used depending on the damping requirements. As the piston body 40 moves upwardly within the working chamber 22 during a high velocity rebound stroke, fluid will flow downwardly through the second plurality of flow ports 64, thereby forcing the valve member 60 downwardly against the resistance of the rebound spring 54, whereby fluid may flow from the upper portion 26 of working chamber 22 to the lower portion 28 of the working chamber 22.

It should be noted that while the anti-swish mechanisms discussed below are described in detail with reference to the damper 10 and the piston assembly 24, the anti-swish mechanisms are not limited to only the configuration of the damper 10 and the piston assembly 24 but may be incorporated into numerous other dampers or piston assemblies, both on the top or bottom of the piston assembly. For instance, the anti-swish mechanisms discussed below could be incorporated into the piston assembly disclosed in U.S. Pat. No. 4,113,072, which is hereby incorporated by reference.

Figure 2A:
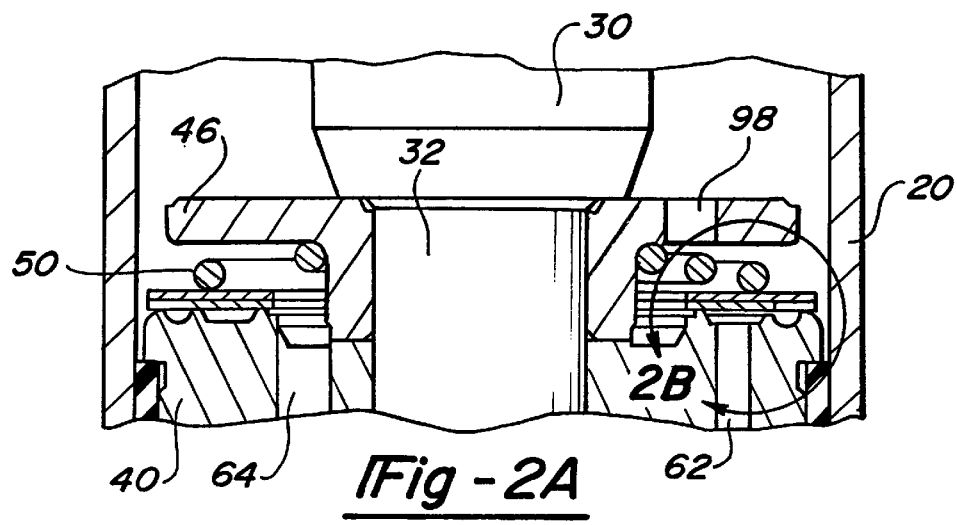
FIG. 2A is an enlarged cross-sectional view of a top portion of the piston assembly shown in FIG. 1A.
Figure 2B:
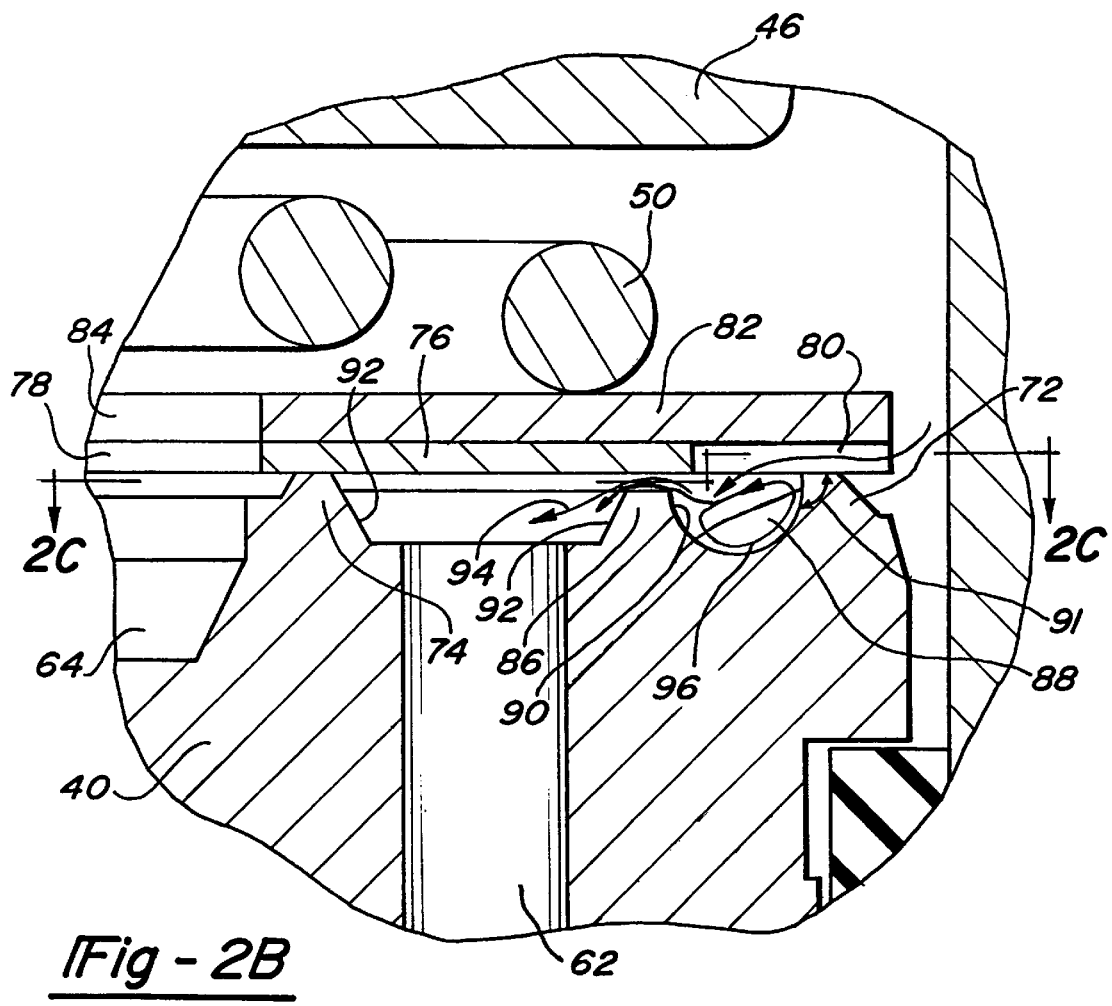
FIG. 2B is an enlarged cross-sectional view of the anti-swish mechanism taken about line 2B in FIG. 2A.
Figure 2C:
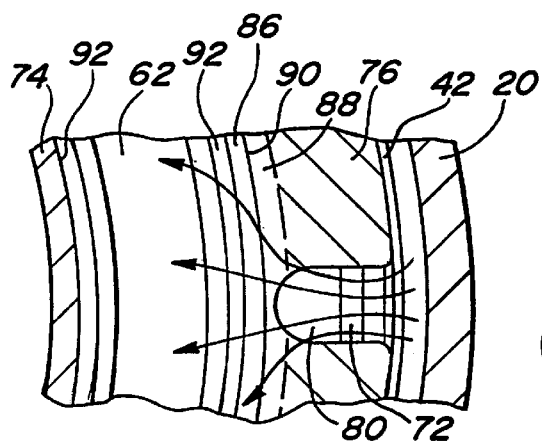
FIG. 2C is a partial top view of the anti-swish mechanism taken along line 2C in FIG. 2B.

Turning to FIGS. 2A and 2B, the top portion of the piston assembly 24 is shown which incorporates one preferred embodiment of the anti-swish mechanism of the present invention. The top of the piston body 40 includes a first annular axially extending land or valve seat 72 and a second annular axially extending land or valve seat 74 concentric with the land 72. The first land 72 and the second land 74 define generally radially extending surfaces, each of which are on the same plane perpendicular to the piston post 30. These surfaces are selectively engaged by a valve member or orifice disk 76 of the intake valve assembly 52. The orifice disk 76 is a generally flat disk shaped valve member having multiple intake orifices 78 for the second plurality of flow ports 64 which enables the damping fluid to pass between the upper portion 26 to the lower portion 28 of the working chamber 22 during high velocity rebound strokes. The orifice disk 76 further includes twelve slot orifices 80, show clearly in FIG. 2C, which enables damping fluid to flow through the first plurality of flow ports 62, which will be described in detail shortly. Positioned atop and concentric with the orifice disk 76 is an intake valve member 82 which is also a generally flat disk shaped valve member. The intake valve 82 includes multiple intake orifices 84, also for the second plurality of flow ports 64. As will be appreciated by those skilled in the art, the intake valve assembly 52 includes the two valve members 76 and 82, however, the intake valve assembly 52 can be configured to have addition valve members depending on the damping required during the compression stroke, as well as various numbers of intake orifices 78 and 84 or slot orifices 80.

Positioned concentrically with and between the first land 72 and the second land 74 is an annular axially extending sub-land 86. The sub-land 86 axially extends slightly less than the first land 72 and the second land 74 by about 0.09 mm and has a top radially extending surface of about 0.30 mm wide which is about the same surface width as the first and second lands 72 and 74. Positioned between the first land 72 and the sub-land 86 is an annular anti-swish chamber 88 which is concentric with the lands 72,74 and 86. The anti-swish chamber 88 has an annular concave semispherical shape having a width of about 1.0 mm and a depth of about 0.6 mm. The edges 90 of the anti-swish chamber 88 have about a 90° entrance angle 91 in contrast to the 120° entrance angles at edges 92 of the flow ports 62. While the anti-swish chamber 88 is described above in relation to specific dimensions, the anti-swish chamber 88 is clearly not limited to only these dimensions. Moreover, the entrance angle 91 at the edge 90 is indicated as being about 90°, however, the entrance angle can also be less than 90°.

In operation, when a low velocity rebound stroke occurs, damping fluid flows from the first portion 26 to the second portion 28 of the working chamber 22 through the first plurality of flow ports 62. Specifically, the fluid flows from the top portion 26 of the working chamber 22, through the orifices 80 in the orifice disk 76, over the land 72 into the anti-swish chamber 88, over the sub-land 86 and through the flow ports 62. As the fluid follows this path, a high speed fluid flow designated by numeral 94 occurs. In addition, the high speed flow 94 causes a lower speed secondary fluid flow 96.

As the fluid enters the orifices 80, a flow restriction occurs due to the restriction caused by the land 72 before the fluid enters the anti-swish chamber 88. Upon entering the anti-swish chamber 88, the restriction is reduced because of the larger area in the anti-swish chamber 88. This causes a slight under pressure at the edge 90 of the land 72. However, because the entrance angle at the edge 90 is about 90°, substantially no swish noise is caused. The fluid then passes over the gap about the circumference between the sub-land 86 and the orifice disk 76 which only causes a slight restriction in the flow of fluid. The fluid then subsequently flows through the ports 62. Because there is only a slight restriction of fluid as the fluid enters the ports 62, there is substantially no under pressure at the edge 92 of the sub-land 86, which thereby reduces or eliminates swish noise as the fluid passes over the edge 92 and enters the ports 62 during low velocity rebound strokes. The anti-swish chamber 88 enhances or stimulates fluid rotation in the secondary fluid flow 96 which enables the secondary fluid flow 96 to fill the area along the edge 90 of the land 72, thereby reducing the under pressure (i.e. cavitation) in this area.

As the velocity of the rebound stroke increases, the valve member 60 is resiliently urged against the rebound spring 54 by fluid in the second plurality of flow ports 64. This creates a second flow path during rebound consisting of fluid passing into orifices 84 and 78 from the upper portion 26 of the working chamber 22. This fluid passes into the orifices 84 and 78 from around the support washer 46 and through three axially extending circumferentially spaced orifices 98 in the washer 46 which are concentric with the piston post 30. Conversely, during compression, fluid flows from the lower portion 28 of the working chamber 22, up through the first set of flow ports 62 and resiliently urges the orifice disk 76 and intake valve 82 upward against the spring 50.

Figure 3C:
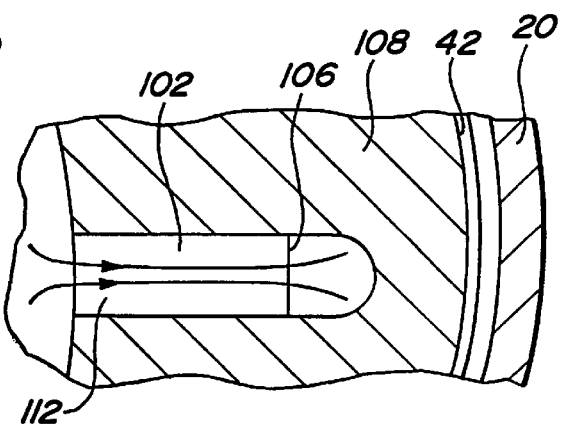
FIG. 3C is a partial top view of the anti-swish mechanism taken along line 3C in FIG. 3B.
Figure 3A:
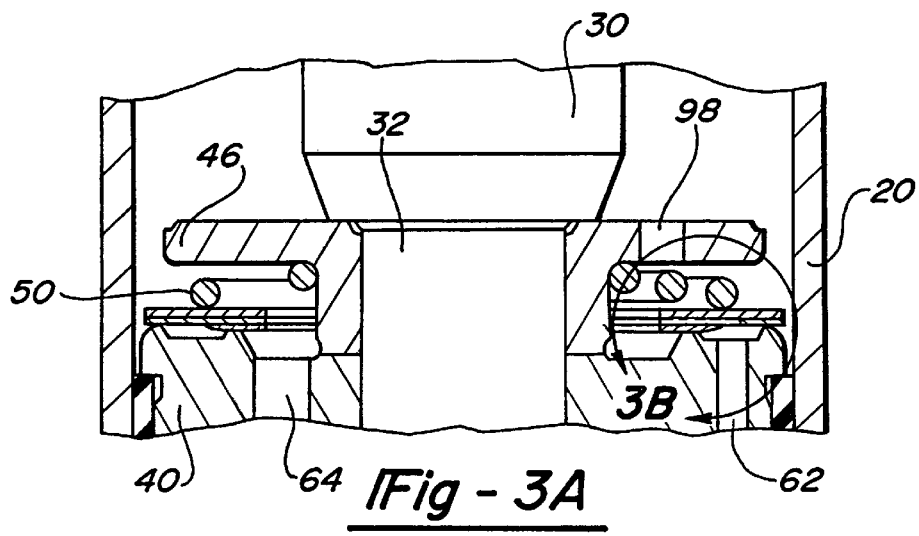
FIG. 3A is an enlarged cross-sectional view of a top portion of a piston assembly utilizing another preferred embodiment of the present invention.
Figure 3B:
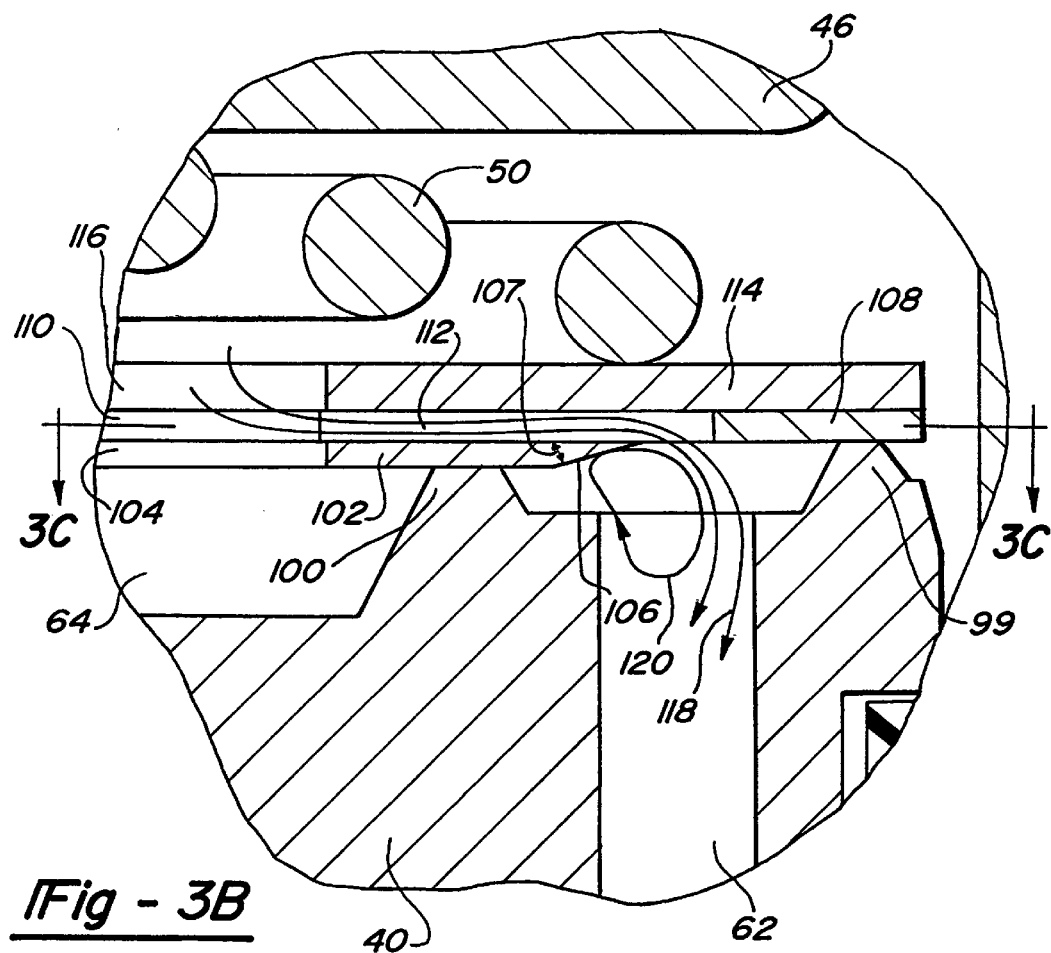
FIG. 3B is an enlarged cross-sectional view of the anti-swish mechanism taken about line 3B in FIG. 3A.

Turning to FIGS. 3A–3C, another preferred embodiment of an anti-swish mechanism is shown incorporated into the piston body 40. The piston body 40 shown in FIGS. 3A–3C is substantially the same as the piston body shown in FIGS. 1A–2C except for the following differences. The first plurality of flow ports 62 are circumferentially farther out than the flow ports 62 shown in FIGS. 1A–2C. The piston body 40 includes only a first annular axially extending land or valve seat 99 and a second annular axially extending land or valve seat 100 concentric with the land 99. The land 100 axially extends slightly less than the first land 99 and is selectively engaged by a first valve member or sharp bleed disk 102. The sharp bleed disk 102 is a generally flat disk shaped valve member having multiple intake orifices 104 for the second plurality of flow ports 64 which enables the damping fluid to pass between the upper portion 26 to the lower portion 28 of the working chamber 22 during high velocity rebound strokes. The sharp bleed disk 102 further includes a concentrically tapered surface adjacent to the piston body 40 at the outer circumferential edge 106 of the sharp bleed disk 102. The angle 107 of the tapered edge is less than 90° and preferably between about 20° to 40°.

Positioned atop the sharp bleed disk 102 is a second valve member or orifice disk 108. The orifice disk 108 is also a generally flat disk shaped valve member having multiple intake orifices 110 for the first and second plurality of flow ports 62 and 64 and twelve axially extending, circumferentially spaced, elongated slot orifices 112, show clearly in FIG. 3C, which enables damping fluid to flow through the first plurality of flow ports 62, which will be described in detail shortly. Positioned atop and concentric with the orifice disk 108 is an intake valve member 114 which is also a generally flat disk shaped valve member. The intake valve 114 includes multiple intake orifices 116, also for the first and second plurality of flow ports 62 and 64.

In operation, when a low velocity rebound stroke occurs, damping fluid flows from the first portion 26 to the second portion 28 of the working chamber 22 through the first plurality of flow ports 62. Specifically, the fluid flows from the top portion 26 of the working chamber 22, through the multiple intake orifices 116 and 110, into the elongated slot orifices 112 and through the flow ports 62. As the fluid follows this path, a high speed fluid flow designated by numeral 118 occurs. In addition, the high speed flow 118 causes a lower speed secondary rotating fluid flow 120. The concentrically taper surface of the circumferential edge 106 reduces restriction of the fluid and enables the secondary fluid flow 120 to fill the area immediately along the edge 106 of the sharp disk 102, thereby reducing the under pressure (i.e. cavitation) in this area to reduce or eliminate the swish noise during low velocity rebound strokes.

Similar to the embodiment in FIGS. 1A–2C, as the velocity of the rebound stroke increases, the valve member 60 is resiliently urged against the rebound spring 54 by fluid in the second plurality of flow ports 64. This creates a second flow path during rebound consisting of fluid passing into intake orifices 104, 110 and 116 from the upper portion 26 of the working chamber 22. This fluid passes into the intake passages 104, 110 and 116 from around the support washer 46 and through the three axially extending orifices 98 in the washer 46. Conversely, during compression, fluid flows from the lower portion 28 of the working chamber 22, up through the first plurality of flow ports 62 and resiliently urges the sharp disk 102, orifice disk 108 and intake valve 114 upward against the spring 50.

Figure 4:
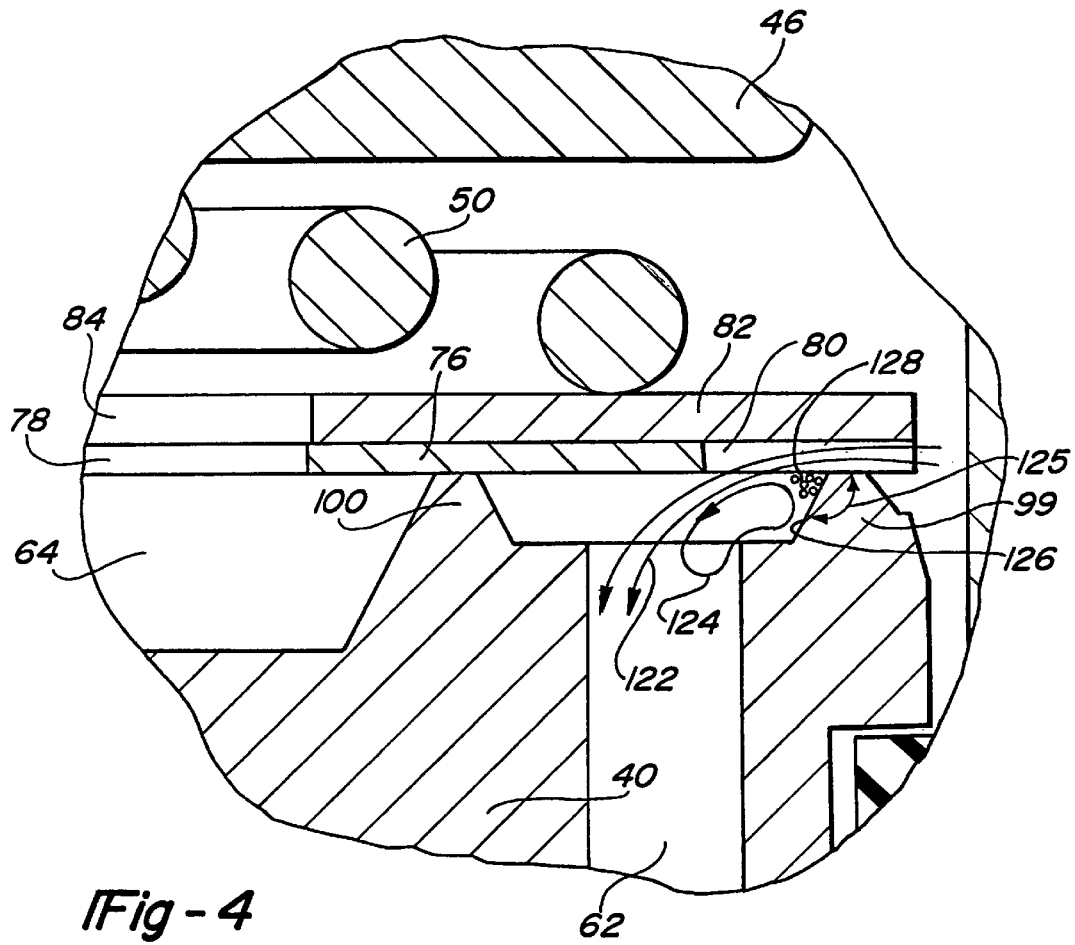
FIG. 4 is an enlarged cross-sectional view of a conventional bleed in a piston assembly without an anti-swish mechanism.

Turning now to FIG. 4, a conventional piston assembly 24 is shown which does not incorporate the above-identified anti-swish mechanisms. The piston body 40 in FIG. 4 is similar to that shown in FIGS. 3A–3C and includes the first and second plurality of flow ports 62 and 64 and the first and second lands 99 and 100. The lands 99 and 100 in FIG. 4 are on the same plane perpendicular to the piston post 30 with the orifice disk 76 and intake valve 82, as shown in FIGS. 1A–2C, positioned atop the lands 99 and 100. The orifice disk 76 includes the intake orifices 78 and slot orifices 80 and the intake disk 82 includes the intake orifices 84. The first plurality of flow ports 62 are also positioned circumferentially out from the first plurality of flow ports 62 shown in FIGS. 1A–2C, similar to that shown in FIGS. 3A–3C.

During a low velocity rebound stroke, damping fluid flows from the first portion 26 to the second portion 28 of the working chamber 22 through the first plurality of flow ports 62. Specifically, the fluid flows from the top portion 26 of the working chamber 22, through the orifices 80 in the orifice disk 76, over the land 99 and through the flow ports 62. As the fluid follows this path, a high speed fluid flow designated by numeral 122 occurs. In addition, the high speed flow 122 causes a lower speed secondary rotating fluid flow 124. As the fluid enters the orifices 80, the flow is restricted due to the land 99. Because of this and the large entrance angle 125 (i.e. 120 degrees) at edge 126, the fluid flowing from the restricted slots 80 into the larger ports 62 causes an under pressure along the edge 126. This under pressure inhibits the secondary oil flow 124 from reaching this area and causes the fluid to vaporize or create bubbles 128 which are heard as the swish noise during the low velocity rebound stroke. Such a condition is reduced or eliminated in the above-identified embodiments since the flow restriction prior to entering the ports 62 is reduced, as well as making the entrance angle of the edge over which the flow restriction enters a large area 90° or less. For example, comparing the swish noise of the embodiment shown in FIGS. 1A–2C with that shown in FIG. 4, the damper in FIG. 4 creates 56 dB (0–16 kHz) of swish noise compared to 50 dB (0–16 kHz) for the damper 10 in FIGS. 1A–2C.

It should also be noted that the embodiment in FIGS. 1A–2C allows more design freedom with respect to placement of the ports 62 in relation to the orifice slots 80 because of the use of the anti-swish chamber 88. In the embodiment in FIGS. 1A–2C, the sub-land 86 will act as an obstacle that divides the fluid over the whole circumference of the anti-swish chamber 88. In other words, all the fluid which enters the orfice slots 80 first passes through the anti-swish chamber 88. In contrast, the damper shown in FIG. 4 shows the ports 62 positioned in line (i.e. 0 degrees) with the orifice slots 80. If the orifice slots 80 are turned or rotated 90° from the ports 62, the fluid flows into the orifice slots 80 and through a groove for a quarter circle before it enters the ports 62 which effects damping and the amount of swish noise heard. Thus, by use of the sub-land 86 and anti-swish chamber 88, positioning of the orfice slots 80 about the circumference of the orfice disk 76 is not as critical as is the damper shown in FIG. 4.

As appreciated by those skilled in the art, while the above anti-swish mechanisms are discussed in detail in relation to low velocity rebound strokes, the anti-swish mechanisms could also be used for both the rebound or compression strokes and for either high or low velocity strokes. This would be achieved by merely positioning the anti-swish mechanisms adjacent to the flow ports where swish noise is occurring.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined by the following claims.

What is claimed is:

1. A damper comprising:
   a pressure cylinder forming a working chamber operable to store damping fluid;
   a piston rod at least partially disposed within said pressure cylinder;
   a piston body disposed in said pressure cylinder and secured to said piston rod, said piston body separating said working chamber into a first portion and a second portion;
   a continuously open flow path extending between said first and said second portions of said working chamber;
   a first annular axially extending land being concentric with said piston body;
   a second annular axially extending land being concentric with said piston body;
   a plurality of axially extending, circumferentially spaced flow ports formed concentrically with said piston body between said first annular axially extending land and said second annular axially extending land; and
   anti-swish means positioned adjacent to said circumferentially spaced flow ports for reducing swish noise as said piston body moves in said pressure cylinder, said anti-swish means being disposed within said open flow path and including an annular axially extending sub-land being concentric with said piston body and positioned between said first annular axially extending land and said second annular axially extending land.

2. The damper as defined in claim 1 wherein said sub-land is positioned adjacent to said plurality of axially extending, circumferentially spaced flow ports.

3. The damper as defined in claim 2 wherein said anti-swish means further includes an annular anti-swish chamber being concentric with said piston body and positioned between said first annular axially extending land and said annular axially extending sub-land.

4. The damper as defined in claim 3 wherein said annular axially extending sub-land axially extends less than said first annular axially extending land, whereby as said damping fluid flows over said annular axially extending sub-land, said sub-land creating less of a fluid restriction as said damping fluid flowing over said first annular axially extending land.

5. The damper as defined in claim 4 wherein said annular anti-swish chamber has a concave semispherical shape with a first edge adjacent said first annular axially extending land and a second edge adjacent to said annular axially extending sub-land, said first and second edges having an entrance angle of about 90° or less.

6. The damper as defined in claim 5 wherein during a stroke of said piston body, damping fluid flows over said first annular axially extending land, into said anti-swish chamber, over said annular axially extending sub-land and into said plurality of axially extending, circumferentially spaced flow ports, said fluid flow generating a first high speed fluid flow and a second lower speed fluid flow, said anti-swish chamber stimulating rotation of said second fluid flow, whereby fluid flows along an edge of said first annular axially extending land to reduce under pressure along said edge for reducing swish noise as said piston body moves in said pressure cylinder.

7. A damper comprising:
- a pressure cylinder forming a working chamber operable to store damping fluid;
- a piston rod at least partially disposed within said pressure cylinder;
- a piston body disposed in said pressure cylinder and secured to said piston rod, said piston body separating said working chamber into a first portion and a second portion;
- a continuously open flow path extending between said first and said second portions of said working chamber;
- a first annular axially extending land being concentric with said piston body;
- a second annular axially extending land being concentric with said piston body;
- an annular axially extending sub-land being concentric with said piston body and positioned between said first annular axially extending land and said second annular axially extending land
- an annular anti-swish chamber being concentric with said piston body between said first annular axially extending land and said second annular axially extending land, said anti-swish chamber being disposed within said open flow path; and
- a plurality of axially extending, circumferentially spaced flow ports formed concentrically with said piston body adjacent to said second annular land, wherein said damping fluid flows from said first portion to said second portion of said working chamber through said plurality of axially extending, circumferentially spaced flow ports, with said damping fluid first passing into said annular anti-swish chamber to reduce swish noise.

8. The damper as defined in claim 7 wherein said sub-land is positioned adjacent to said set of axially extending, circumferentially spaced flow ports.

9. The damper as defined in claim 8 wherein said annular axially extending sub-land axially extends less than said first annular axially extending land, whereby as said damping fluid flows over said annular axially extending sub-land, said sub-land creates less of a fluid restriction as said damping fluid flows over said first annular axially extending land.

10. The damper as defined in claim 9 wherein said annular anti-swish chamber has a concave semispherical shape with a first edge adjacent said first annular axially extending land and a second edge adjacent to said annular axially extending sub-land, said first and second edges having an entrance angle of about 90° or less.

* * * * *